United States Patent
Warkentin

[11] 3,720,039
[45] March 13, 1973

[54] BOX FILLING APPARATUS

[76] Inventor: Aaron James Warkentin, 23561 East Dinuba Avenue, Dinuba, Calif.

[22] Filed: Nov. 5, 1970

[21] Appl. No.: 87,091

[52] U.S. Cl. ................... 53/59 W, 53/63, 177/53, 177/121
[51] Int. Cl. .............................. B65b 57/00
[58] Field of Search ........ 53/59 W, 63; 141/128, 140, 141/141; 177/53, 121, 122

[56] References Cited

UNITED STATES PATENTS

| 2,659,564 | 11/1953 | Gibson | 177/121 |
| 3,416,619 | 12/1968 | McClusky | 177/53 |
| 3,073,399 | 1/1963 | Durand | 177/122 X |

*Primary Examiner*—Travis S. McGehee
*Attorney*—Lyon & Lyon

[57] ABSTRACT

An apparatus for filling boxes with produce such as plums, apples, citrus fruit, melons, or vegetables such as potatoes, or the like, comprises an endless belt conveyor which is drive when energized by a variable electric motor at a fast or full speed until the box to be filled is substantially 95% filled and then stops momentarily after which it proceeds at a slower speed to cause a dribble feed to fill the box to substantially 100 percent of the desired weight. The momentary stop is to accommodate fruit which is freely falling, which occasionally causes the box to be substantially 100 percent filled without the necessity of the dribble feed. Associated means drives boxes to be filled to a scale, which scale has associated switches to control the stopping of the fast run of the conveyor belt, the starting of the slow run of the conveyor belt, and eventually to stop the conveyor belt and start the index motor to convey the boxes to be filled to the scale and, when filled, off of the scale. A safety switch is provided to prevent running of the conveyor in the absence of a box to be filled.

The apparatus is arranged so that the conveyor of the produce to the boxes to be filled runs countercurrent into the path of the boxes, or alternately in the same direction thereof. The speed of the conveyor is adjustable to accommodate different size fruit and different rates of packing.

9 Claims, 7 Drawing Figures

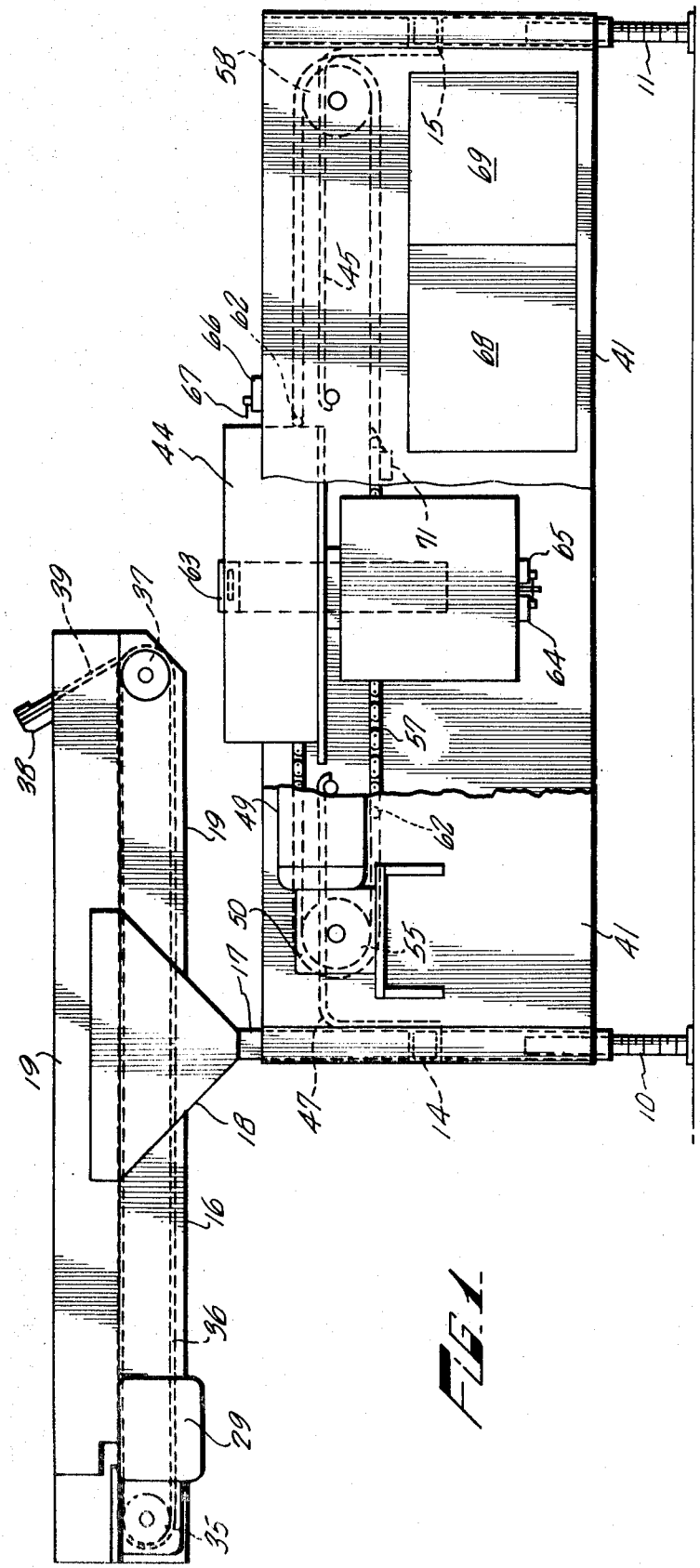
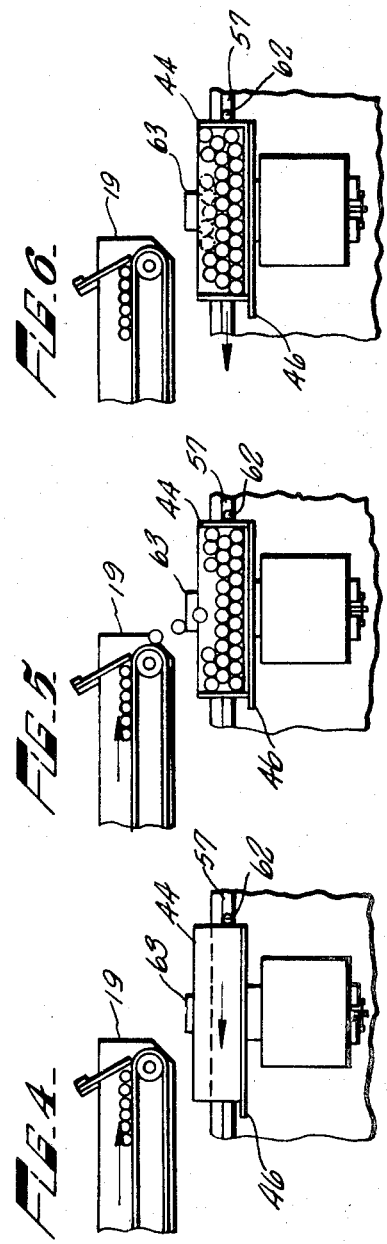

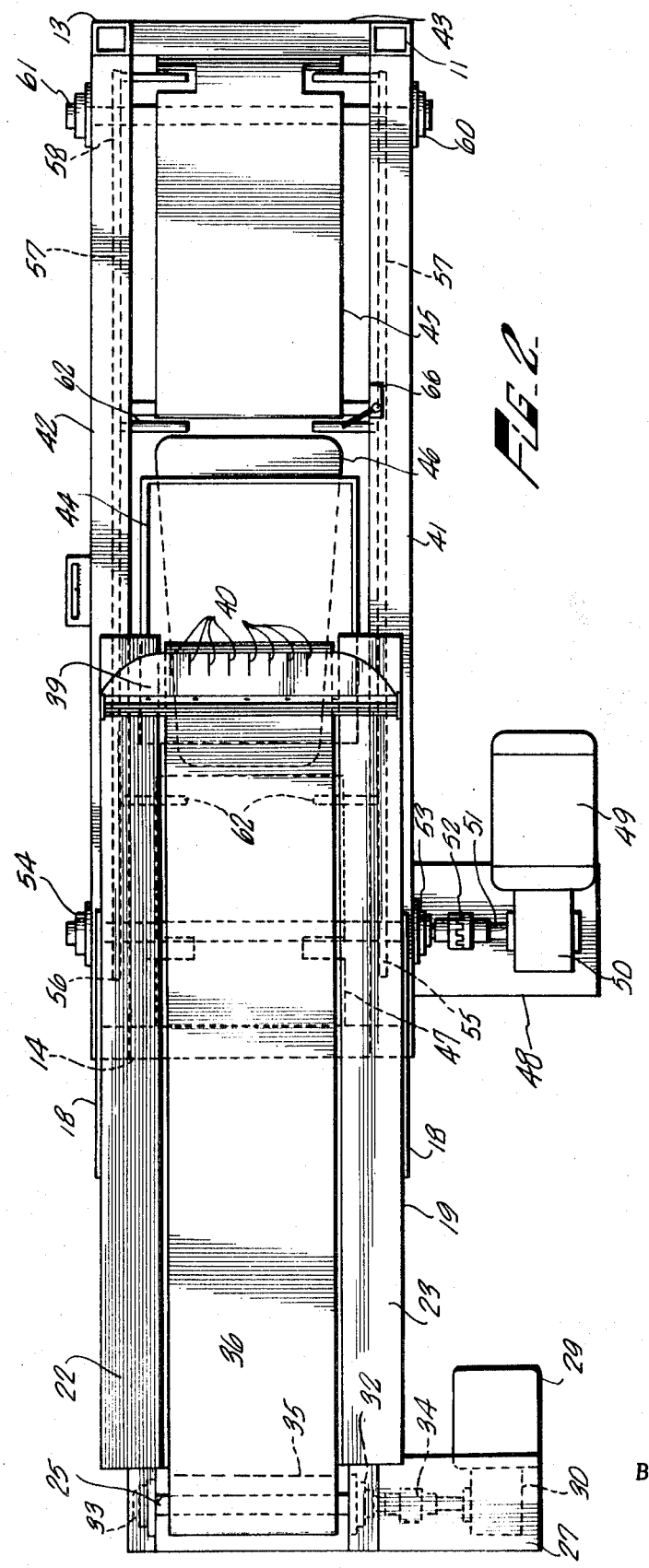

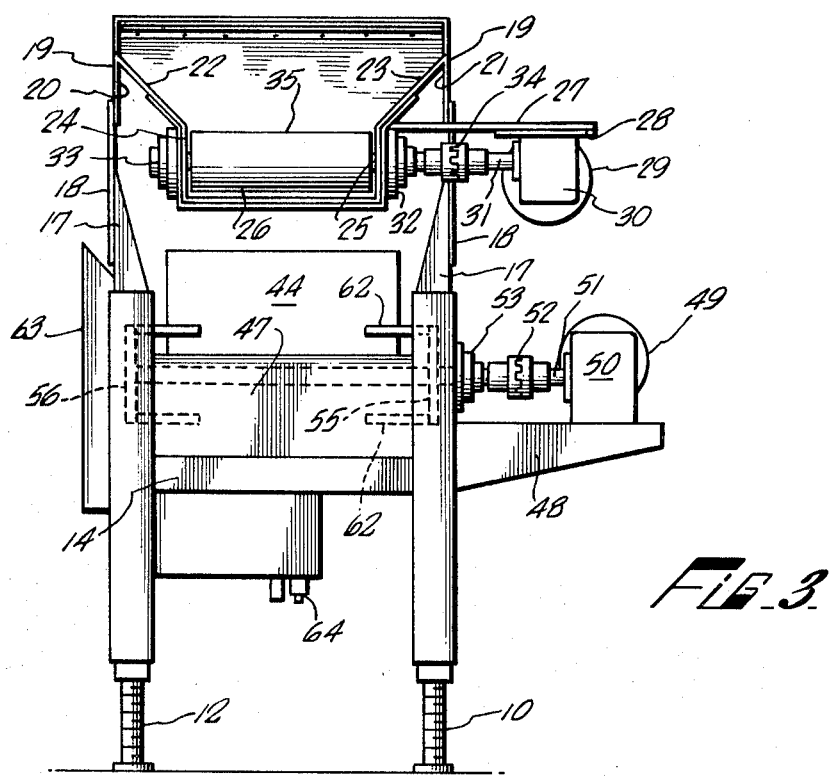
Fig. 3
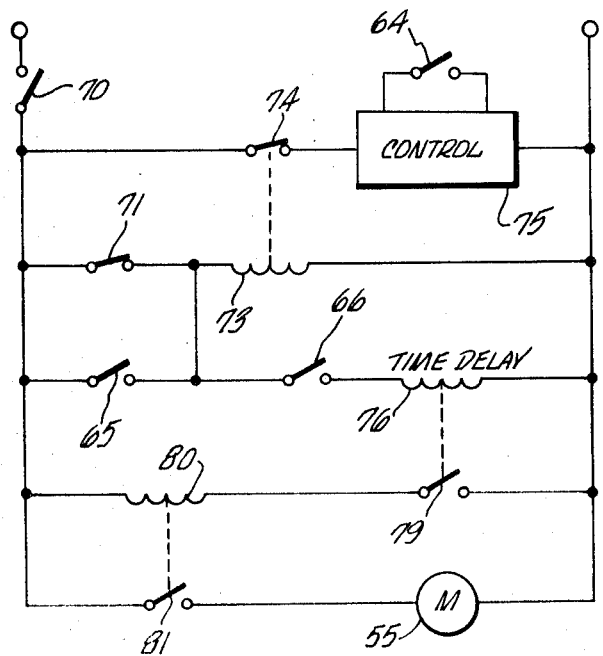
Fig. 1
INVENTOR.
AARON JAMES WARKENTIN
BY
ATTORNEYS 3,720,039

BOX FILLING APPARATUS

INTRODUCTION

This invention relates to an apparatus for filling boxes with produce, such as plums, apples, citrus fruit, melons, or vegetables such as potatoes, or the like, and comprises a single conveyor belt for conveying the produce to the boxes to be filled, which conveyor belt is run at a first fast speed which fills the boxes being filled to substantially 95 percent of the desired weight and then stops momentarily, after which it proceeds at a slow speed to dribble feed the boxes to substantially 100 percent of the desired weight. It sometimes happens that the momentary stop of the belt permits fruit that is dropping to fill the boxes being filled to 100 percent substantially, without actuating the slow speed to dribble fill. The above described method of filling boxes has been found so accurate as to permit it to weigh for count particularly with produce which is more or less uniform weight for individual item.

It is accordingly one object of the present invention to provide an apparatus of the type described which utilizes a single conveyor belt for the produce.

It is another object of the present invention to provide apparatus of the type described which is compact and which can be arranged for conveying the fruit in a path counter-current to or parallel with the boxes being fed to the weighing station.

It is a feature of the present invention that safety means are provided for preventing the actuation of the conveyor belt in the absence of a box to be filled.

It is a feature of this invention that the speed of the conveyor belt may be adjusted to accommodate different size produce and different rates of packing.

These and other objects, features and advantages will be apparent from the annexed specification, in which:

FIG. 1 is a side view of a device embodying the present invention;

FIG. 2 is a top view thereof;

FIG. 3 is a left end view thereof;

FIG. 4 is a fragmentary side view of a portion of the device illustrating the beginning of the filling of a box;

FIG. 5 is a view similar to FIG. 4, illustrating an intermediate condition;

FIG. 6 is another view similar to FIGS. 4 and 5, illustrating the completion of the filling of a box; and FIG. 7 is a schematic wiring diagram.

Referring now more particularly to the drawings, the device of this invention has a frame supported by four adjustable legs 10, 11, 12 and 13. The upper portion of each of these legs is in the form of a hollow rectangular box-like structure with open ends for a purpose to be described later. A cross beam 14 joins legs 10 and 12, while a like cross beam 15 joins legs 11 and 13.

An endless conveyor 16 is supported by legs 17 extending into the upper ends of legs 10 and 12. This conveyor is further supported by a pair of gusset plates 18, one welded to each leg 10 and 12 and to the channel 19 which houses the actual conveyor.

The channel 19 is best seen in FIG. 3 and it comprises side plates 20 and 21 to which are attached downwardly slanting plates 22 and 23, which in turn are attached to vertical plates 24 and 25. Vertical plates 24 and 25 carry bottom plate 26.

On the right side (FIG. 3) a plate 27 extends outwardly from the conveyor and carries a pad 28 on which is mounted a variable speed motor 29, a gear box 30 which drives a shaft 31. Shaft 31 through clutch 34 and bearings 32 and 33 drives a roller 35 around which is passed an endless conveyor belt 36. A second roller 37 is mounted adjacent the inward end of the channel 19, and the endless belt 36 also passes over the roller 37 as shown. Also adjacent the inward end of the channel 19 a support 38 is attached, to which support there is affixed a rubber flap 39 which is slotted as at 40, so that produce conveyed on the belt 36 is forced to proceed one at a time as it passes off of the belt 36.

Also supported on the legs 10, 11, 12 and 13 is a box conveying means. The box conveying means is enclosed by side plates 41 and 42 and end plate 43. Within the enclosure thus formed there is disposed a supporting structure for produce boxes 44 which comprises a first plate 45, a scale bed 46 and a second plate 47. Mounted on a platform 48 extending outwardly from the side plate 41 are a motor 49 and a gear box 50 which drive a shaft 51 which through clutch 52, bearings 53 and 57 drive a pair of sprockets 55 and 56 over which is passed a pair of endless chains 57. The chains 57 also pass over idler sprockets 58 carried by a shaft 59 mounted in bearings 60 and 61. The chains 57 carry spaced inwardly extending fingers 62 adapted to engage the rear end of boxes 44 and to propel them from plate 45 to bed 46 and thence to plate 47 from which they may pass to the usual roller conveyor present in most packing houses.

There is a scale 63 whose bed 46 is utilized. This scale is of the conventional type which can be set so that downward movement of the plunger (through linkage not shown) actuates first a switch 64 and then on further downward movement a switch 65. The switch 64 is the 95 percent switch, by which is meant that it is actuated when the box 44 on the scale bed 46 is filled to 95 percent of the desired amount of produce. The switch 65 is the 100 percent switch, which means that it is only actuated when the box is 100 percent filled.

Placed in the path of the boxes as they pass along plate 45 to bed 46 is a safety switch 66 which will be open unless a box 44 is present to engage the arm 67 thereof and thus close the switch.

The motors 29 and 55 are controlled by the switches 64, 65 and 66 and by electrical components housed in box 68 plus an M series Browning control 75 housed in box 69.

The normal positions of the various switches is as shown in FIG. 7. The circuit is energized by closing on/off switch 70. A lug on the chain 57 causes normally closed box index switch 71 to open, and the box to be filled causes the normally open safety switch 66 to close. With the switch 71 open, relay winding 73 is de-energized which allows switch 74 to close. Closing of switch 74 supplies power to an M Series Browning control 75 for the belt drive motor. Although the safety switch 66 is closed at this time, the time delay relay winding 76 is not energized inasmuch as both the box index switch 71 is open and a 100 percent limit switch 65 is open.

As filling of the box reaches the 95 percent point, a 95 percent limit switch 64 is closed. This switch is coupled with speed control terminals numbers 9 and 10 of the Browning motor control 75 and, upon closure of switch 64, the belt drive motor 55 stops for an instant because of the characteristics of the control 75, and then the control 75 causes the drive motor to run at a lower speed.

When the 100 percent level is reached, the 100 percent limit switch 65 closes thereby energizing the winding 76 of the time delay relay through the closed safety switch 66. Closure of the limit switch 65 also energizes the relay winding 73 which in turn opens the switch 74. When the switch 74 opens, the control 75 is de-energized thereby stopping the feed belt. After the finite time delay of the time delay relay 76, contacts 79 thereof close, energizing relay winding 80. When this winding is energized, normally open contacts 81 close to energize an index motor 55. This operation causes the index conveyer to start to move. A lug on the chain moves away from the box index switch 71 thereby allowing this switch to return to its normally closed position and maintain the winding 73 energized and the winding of the time delay relay 76 energized through the still closed safety switch 66 even after the 100 percent limit switch 65 opens as the filled box moves off the scale bed 46. Inasmuch as the index switch 71 is closed, the winding 73 is energized maintaining switch 74 open and the control 75 de-energized. The time delay relay 76 also is still energized maintaining switch 79 closed, relay winding 80 energized and switch 81 closed such that the index motor 55 remains energized.

When the next chain lug hits the index switch 71, this switch opens thereby opening the circuit to the winding 73 and the time delay relay 76. When the time delay relay 76 is de-energized, switch contacts 79 open thereby de-energizing the index motor 55 by de-energizing winding 80 and opening switch contact 81. When the relay winding 73 is de-energized, the switch contacts 74 close thereby again energizing the control 75. Thus, the belt starts at full speed to commence a new fill cycle.

With boxes to be filled on the plate 45 and scale bed 46 the operation of the above described mechanism is as follows: While produce which may be fruit, such as plums, apples, citrus, melons, or vegetable such as potatoes, or the like, is fed to belt conveyor 36, the on/off switch 70 is closed. As the index switch 71 has been left open due to the presence of a lug on the chain 57, winding 73 is de-energized allowing switch 74 to be closed thereby energizing the Browning control 75 to drive belt 36. This belt 36 will proceed at full speed until the box on the bed 46 is filled to substantially 95 percent of its intended capacity. This will then close switch 64. There will be a slight delay during which the belt stops and any produce falling free will land in the box. Often this will result in a full box, so that substantially 100 percent switch 65 is closed, but if not, switch 64 reduces the speed of the belt 36 to a "dribble feed" until the box is filled to substantially 100 percent of its capacity, at which time switch 65 is definitely closed. Browning control 75 is de-energized as switch 74 has opened and belt 36 is stopped. Index motor 55 starts, after a time delay of relay 76, moving a new box onto the bed 46 and the previous box to plate 47. This completes the cycle of operations.

It has been noted previously that the upper portion of legs 10, 11, 12 and 13 is in the form of a hollow rectangular box-like structure with open ends. It will now be noted that in FIGS. 1 and 3 the legs 17 extend into the legs 10 and 12; however there is a loose fit so that, if so desired, the device may be assembled with legs 17 extending into the top of legs 11 and 13 with the entire conveyor facing in the opposite direction so that boxes and produce move in the same direction, which may be useful in some packing houses. Furthermore, the Browning Control 75 contains in its circuits a variable resistance means by means of which the speed of the conveyor belt 36 may be adjusted to accommodate the device for different size produce and different rates of packing.

While there has been described what at present is considered a preferred embodiment of the present invention it will be apparent to those skilled in the art that various changes and modifications can be made therein without departing from the true spirit and essence of the invention.

What is claimed is:

1. Apparatus for filling boxes to a predetermined weight, comprising in combination:
   a conveyor for delivering articles to a box filling station,
   variable speed drive means for moving said conveyor at full speed or dribble feed rate, or to cause the conveyor to stop,
   means for intermittently moving boxes through said box filling station to receive articles by gravity fall from said conveyor,
   a weighing scale at said filling station arranged to weigh each box as it is being filled,
   means actuated by said weighing scale to cause said variable speed drive means to stop said conveyor when a box at the filling station is nearly filled, to permit gravity fall into said box of any additional articles that are between said conveyor and said box during a definite time interval,
   and means thereafter actuated by said weighing scale to cause said conveyor to operate at a dribble feed rate if said box is not quite full, and to cause the conveyor to operate at full speed if the box is completely full, the latter said means in the latter case causing the box moving means to displace the full box by an empty box at said box filling station.

2. A box filling apparatus as set forth in claim 1 in which said variable speed drive means comprises a variable speed motor controlled by switches actuated by said scale.

3. A box filling apparatus as set forth in claim 1, including a safety switch actuated by contact with a box which prevents actuation of said conveyor in the absence of a box to be filled.

4. A box filling apparatus as set forth in claim 1 in which said means for intermittently moving boxes comprises an index motor driving an endless chain having lugs for engaging boxes to propel them to said scale, said index motor being controlled by means associated with said chain.

5. A box filling apparatus as set forth in claim 2 in which said switches actuated by said scale comprise a pair of limit switches one of which is closed when said box on the scale is substantially 95 percent filled and the second of which is closed when the said box is substantially 100 percent filled.

6. A box filling apparatus as set forth in claim 5 in which the closing of said switch when the box on the scale is substantially 95 percent filled causes said conveyor to momentarily stop and then to proceed at low speed to cause a dribble feed to the box on the scale.

7. A box filling apparatus as set forth in claim 2 in which said switches actuated by said scale govern a control for the variable speed motor which control includes a means for varying the speed at which said conveyor is run when at its full speed.

8. A box filling apparatus as set forth in claim 6 in which the closing of said switch which is closed when said box is substantially 100 percent filled stops said conveyor.

9. A box filling apparatus as set forth in claim 6 in which the closing of said switch which is closed when said box is substantially 100 percent filled starts, after a built-in time delay, an index motor driving an endless chain having lugs for engaging boxes to propel a new one to said scale.

* * * * *